United States Patent [19]
Wood

[11] 3,929,420
[45] Dec. 30, 1975

[54] DUAL CROSS-FLOW CANISTER

[75] Inventor: William P. Wood, Marine, Minn.

[73] Assignee: Minnesota Mining and Manufacturing Company, St. Paul, Minn.

[22] Filed: Aug. 31, 1973

[21] Appl. No.: 393,339

[52] U.S. Cl. ............ 23/288 FB; 23/288 FC; 60/299; 423/212; 252/477 R
[51] Int. Cl.² ...................... B01J 35/04; F01N 3/15
[58] Field of Search ...... 23/288 F, 288 FB, 288 FC; 60/287, 289, 290, 295, 301, 307; 423/212, 213.2, 213.7; 165/180; 220/5 A

[56] References Cited
UNITED STATES PATENTS

| | | | |
|---|---|---|---|
| 3,065,595 | 11/1962 | Gary | 23/288 F |
| 3,295,919 | 1/1967 | Henderson et al. | 23/288 F |
| 3,470,689 | 10/1969 | Gurr | 60/307 |
| 3,644,098 | 2/1972 | De Palma et al. | 60/295 X |
| 3,662,540 | 5/1972 | Murphey | 23/288 F X |
| 3,701,823 | 10/1972 | Hardison | 423/213.7 |
| 3,741,725 | 6/1973 | Graham | 423/213.7 |
| 3,773,894 | 11/1973 | Bernstein et al. | 23/288 F X |
| 3,801,289 | 4/1974 | Wiley | 23/288 F |

*Primary Examiner*—Morris O. Wolk
*Assistant Examiner*—Michael S. Marcus
*Attorney, Agent, or Firm*—Alexander, Sell, Steldt & Delahunt

[57] ABSTRACT

A canister is provided for a dual cross-flow supported catalyst wherein inlet and outlet means bring exhaust gases directly into and away from the supported catalyst without change of direction and means are provided for introduction of air as desired into a double plenum between directions of flow through the catalyst support.

2 Claims, 7 Drawing Figures

DUAL CROSS-FLOW CANISTER

This invention relates to a canister for mounting a dual cross-flow supported catalyst and particularly one for a rather thin catalyst support in which there is relatively little change of direction of flow.

In the co-pending application of James R. Johnson, Ser. No. 321,021, filed Jan. 4, 1973, now U.S. Pat. No. 3,860,535 are described dual cross-flow supported catalyst systems which permit simultaneously effecting two reactions, one of which is endothermic or requires elevated temperatures and one of which is exothermic, in a single supported catalyst structure. Because these structures are intended particularly for use in automobile exhaust systems to render pollutants innocuous, it is especially necessary to provide a canister system for the supported catalyst which permits introduction of exhaust from the engine with thorough mixing and turbulence inasmuch as dwell time is very short and catalytic effects can only be expected for these molecules of the gas stream which contact the catalyst. Additional air is also usually required to be thoroughly mixed into the gases.

It is an object of this invention to provide a canister for a dual cross-flow supported catalyst in which there is good turbulence and into which extra air can be admitted as needed. Other objects will become evident hereinafter.

In accordance with these and other objects of the invention, a canister is provided having manifolding means permitting introduction of waste gases or exhaust gases so that they directly enter the catalyst and so that air can be admitted between catalytic stages. Changes in direction of the stream from entry to exit total about 270°, neglecting internal baffling. The canister is suitably made of mild or non-corrosive steel sheet 1.5 mm (16 gauge, 0,060 inches) thick.

This invention will become more readily understood by reference to the accompanying drawings wherein.

Figure 1:
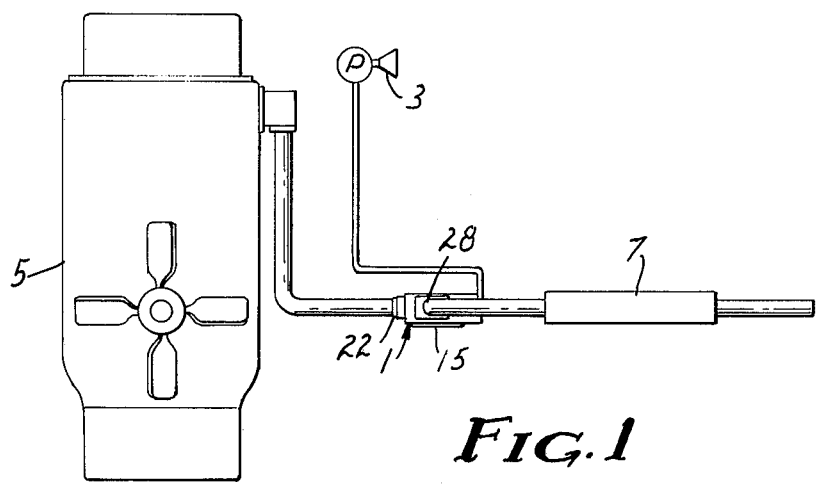
FIG. 1 is a diagrammatic representation of the manner in which a canister of the invention is employed.
Figure 2:
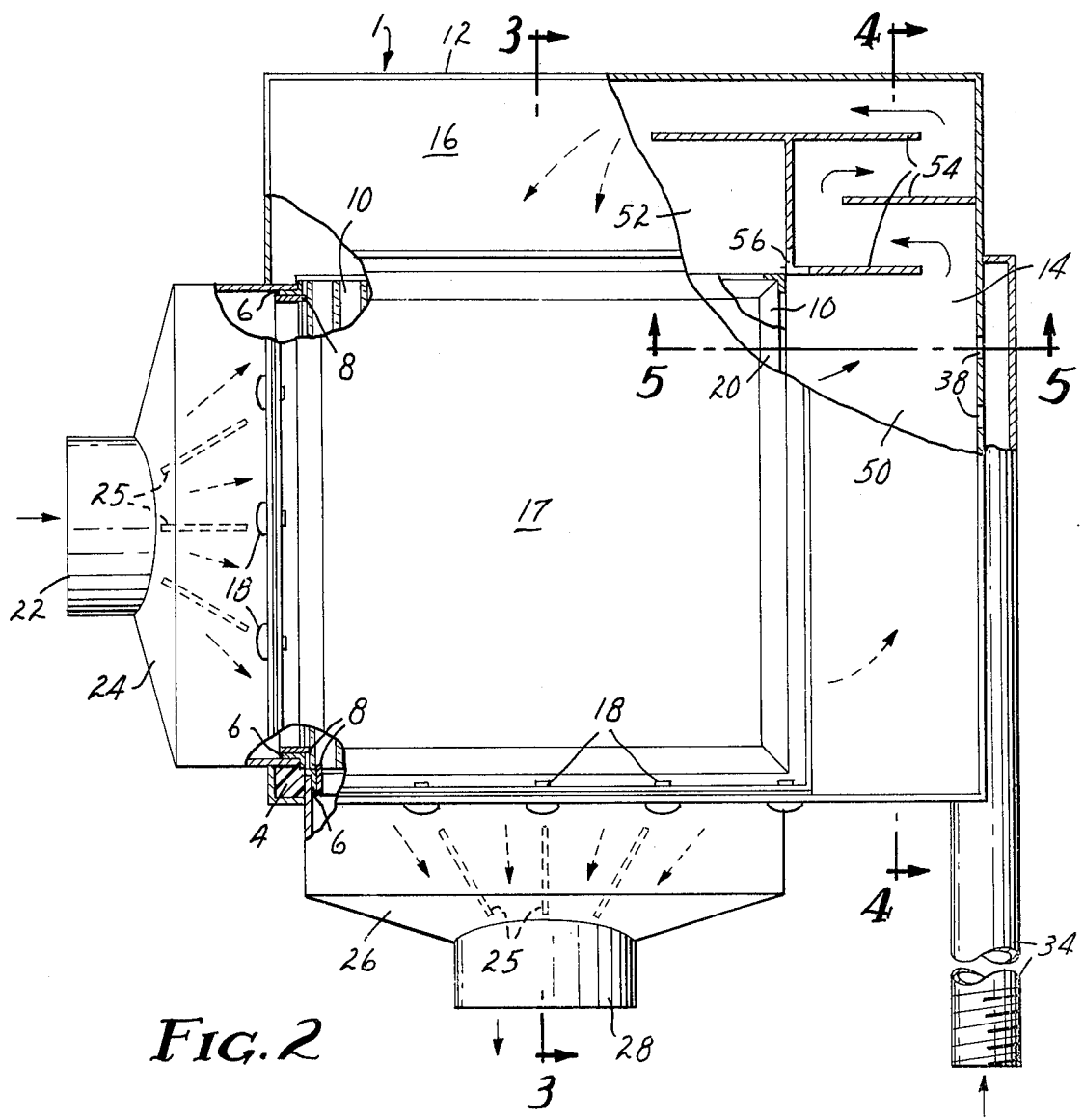
FIG. 2 is a top view of one embodiment of a canister of the invention partly broken away.
Figure 3:
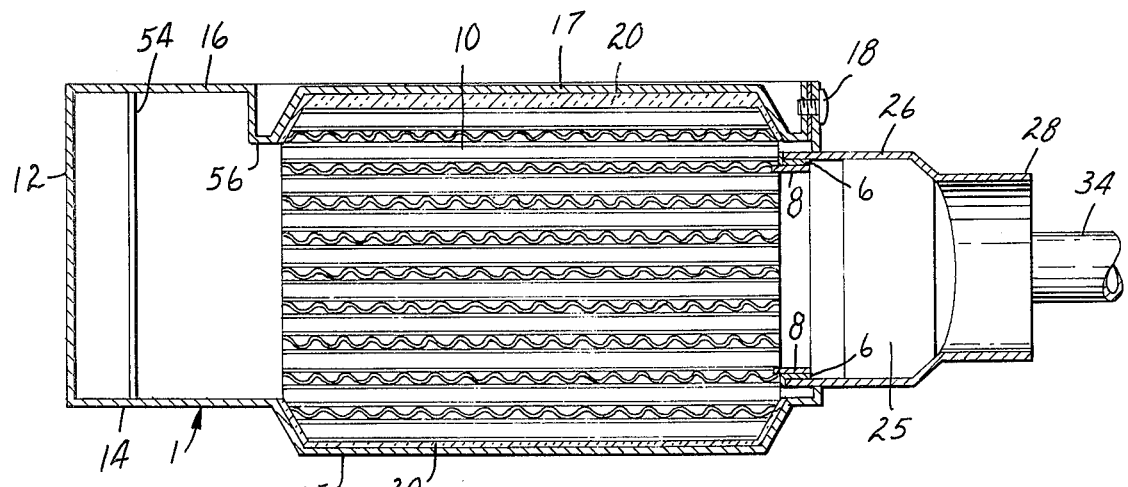
FIG. 3 is a cross-section at line 3—3 of the canister of the invention of FIG. 2.
Figure 4:
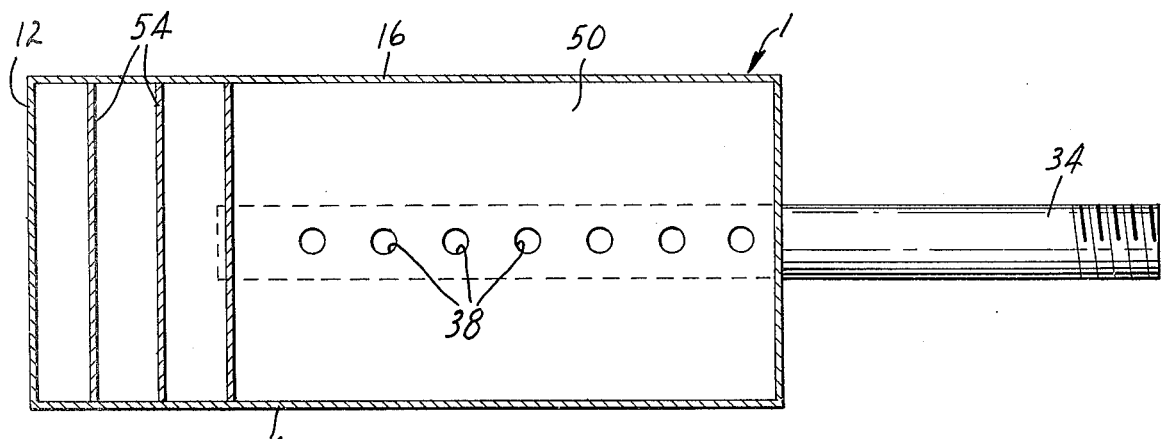
FIG. 4 is a cross-section at line 4—4 of the canister of the invention of FIG. 2.
Figure 5:
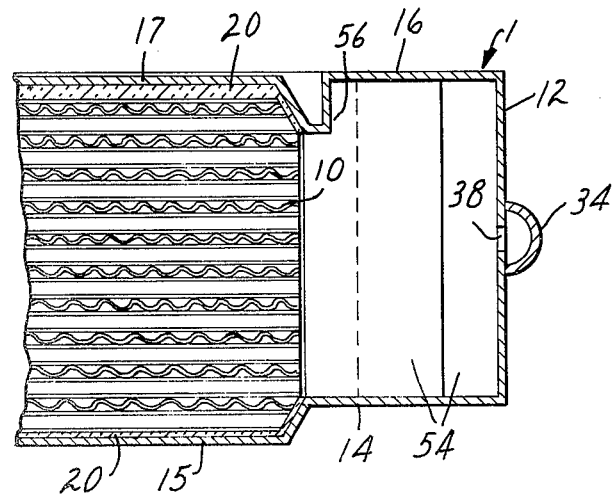
FIG. 5 is a partial cross-section of the canister of the invention of FIG. 2 taken at line 5—5.

Referring to FIG. 1, it will be seen that a canister of the invention 1 having inlet port 22 and outlet port 28 is connected to pump 3 for introduction of air as needed and that one position on the canister, the inlet, is connected to engine 5 and other position is connected to muffler 7.

Referring to FIGS. 2-5 inclusive which refer to a first embodiment of the invention, it will be seen that catalyst support 10 is positioned in canister 1 between lid 16 and bottom 14. Outer wall 12 of canister 1 is provided with rectangular openings adjacent to one corner. Lid 16 and bottom 14 are welded to outer wall 12 after insertion and positioning of ceramic catalyst support 10 in mating dished portions 15 and 17 except that lid 16 is fastened by screws 18 above the rectangular openings. Pads 20 suitably made of an intumescent sheet material as described in the co-pending application of others Ser. No. 393,587 filed of even date herewith, are provided between support 10 and lid 16 and bottom 14. It will be recognized that the sequence of operations such as welding and convenience in assembly may dictate the making of sub-assemblies of pieces in an order different from that in which they are described.

Catalyst support 10 is provided with metallic fins 8 preferably of low expansion alloy such as those available under Trademark names Kovar or Invar, preferably embedded in the ceramic. Inlet manifold 24 to which is connected inlet port 22 and containing vanes 25 is fitted into one rectangular opening in wall 12 against gasket material 6 and welded in place. Likewise, outlet manifold 26 to which is connected outlet port 28 and also containing vanes 25 is pressed against support 10 and gaskets 6 through the other rectangular opening and welded in place. At least space 4 is also filled with cement composed of cordierite and aluminum dihydrogen phosphate solution to assure a secure seal between inlet and outlet manifolds and to prevent blow-by of gases. It is important to reduce or eliminate such blow-by as otherwise gases containing pollutants escape the action of the catalysts. The side of catalyst support 1 opposite inlet manifold 24 opens into first plenum space 50 into which also open air inlet holes 38 from air inlet manifold 34. First plenum space 50 connects to second plenum space 52 on the face of catalyst support 10 opposite outlet manifold 26 preferably through a labyrinth of baffles 54. Baffles 54 are recessed as indicated at 56 to provide for attachment of top 16. It will be recognized that both plenum spaces 50 and 52 may be made less high so that they extend only across the faces of catalyst support 10 rather than above it. This will only affect gas velocities in the plenums.

It will be noted that the edges of catalyst support 10 are chamferred at an angle of about 60° and that this permits close positioning within the canister and that force is spread over the large areas at top and bottom.

Figure 6:
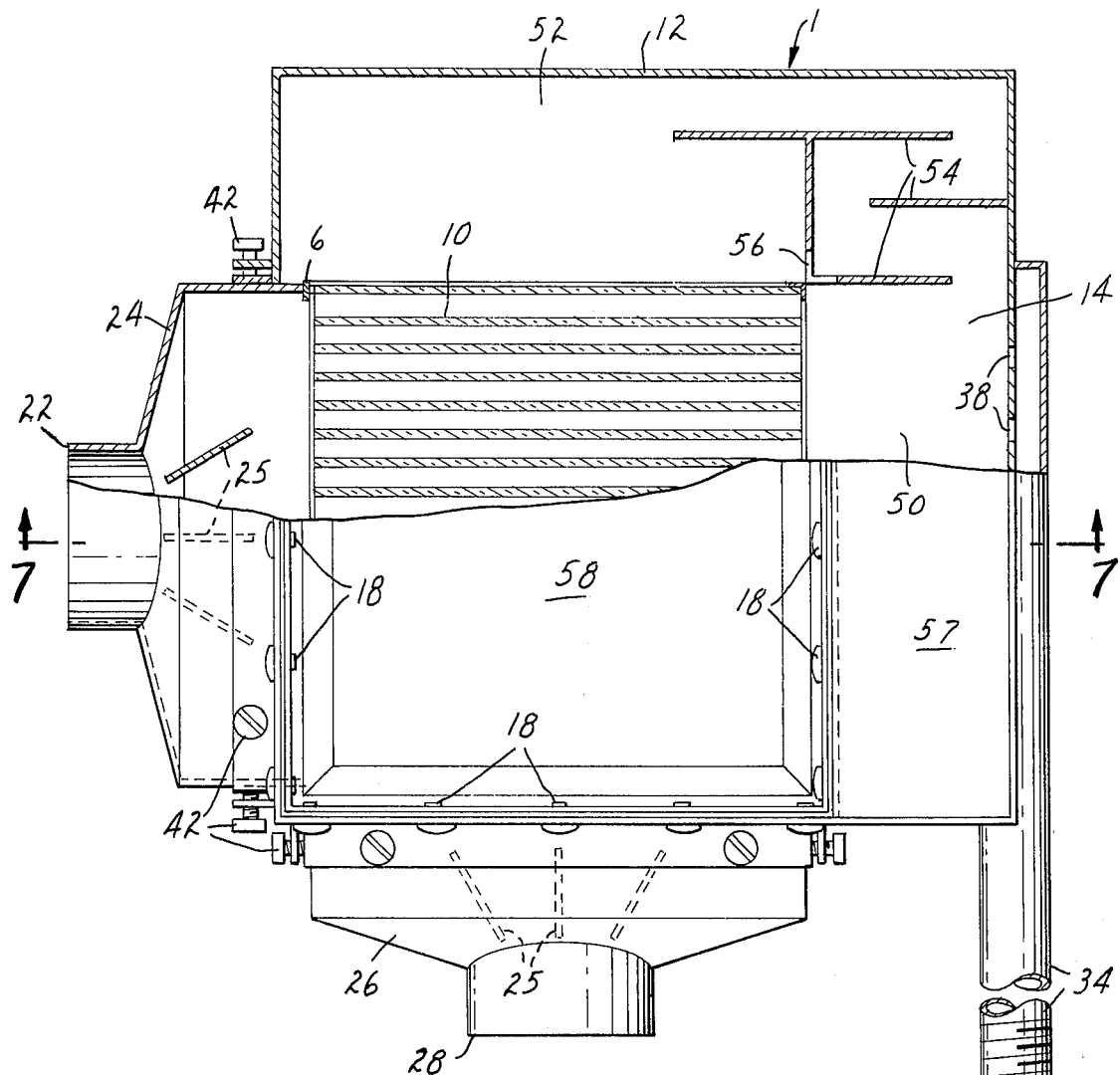
FIG. 6 is a top view of a second embodiment of a canister of the invention.
Figure 7:
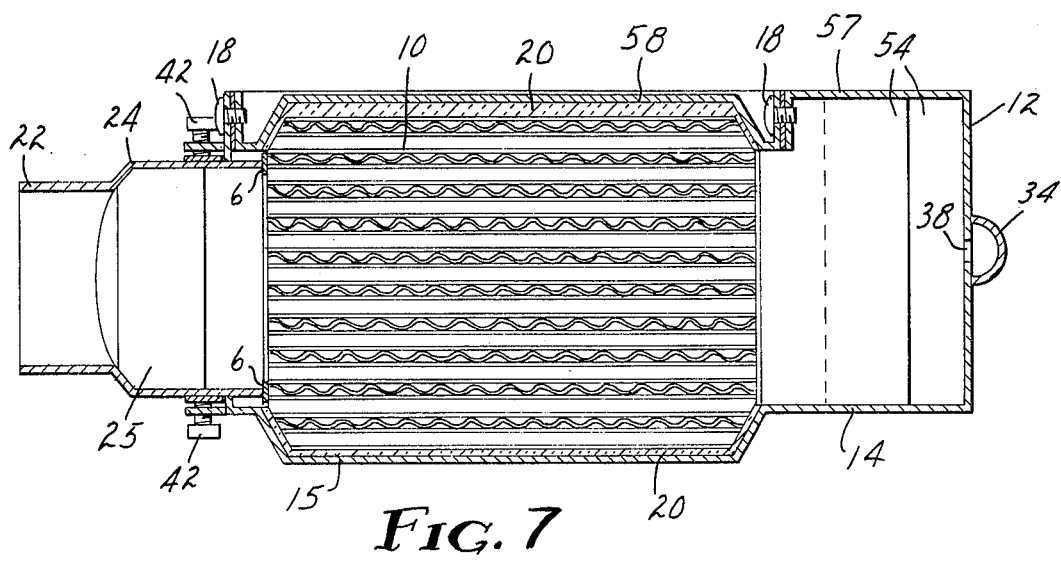
FIG. 7 is a cross-section at line 7—7 of the canister of the invention of FIG. 6.

The embodiment of the invention shown in FIGS. 2-5 is particularly constructed with the catalyst support cemented in place to prevent blow-by. In FIGS. 6 and 7 is shown another embodiment in which the support is replaceable and adapted otherwise to being positioned as before. In FIGS. 6 and 7 the same indicia are used for identical parts. The significant differences are that manifolds 24 and 26 are fastened into the rectangular openings by screws or bolts 42 in flaps 40 and the upper surface is composed of two parts, an L-Shaped part 57 welded to walls 12 with lip 51 and a dished lid 58 attached by screws or bolts 18 along all four edges either to lip 51 or wall 12, the joints being sealed by gasketing material 53. Freedom from blow-by is achieved by use of a gasketing material 6, preferably a resilient inorganic mat material such as asbestos paper, against which the edge of the manifold presses. No fins are needed on the catalyst support and the gasketing material may suitably be adhered to the edges of the catalyst support.

Thus the invention is seen to be a container or canister for dual cross-flow catalyst-support comprising, in combination, a casing of generally parallelepipedal shape with a square outline having square top and bottom and outer wall of four rectangular sides and means securing said top and bottom to said outer wall, two of said sides having a common corner therebetween and having equal rectangular openings therein adjacent said common corner, one other of said sides having openings for air inlets and having an air manifold over said openings externally of said casing; said top and bottom of said casing having square dishing outward opposite the said rectangular openings in said two sides, said casing containing and holding a refractory ceramic square dual cross-flow catalyst support with ends mating the dishing in said top and bottom and positioned within said casing with pads of intumescent sheet material between said catalyst support and said top and bottom and with two faces of said catalyst support having a first common cross therebetween at the rectangular openings in the said two sides of said casing and two other faces of said catalyst support having a second common corner therebetween, one of said two other faces facing into a first plenum into which said air inlets open and the other into a second plenum; baffles in said casing adjacent said second common corner of said catalyst support providing a labyrinthine connection between said first plenum and said second plenum for mixing gases entering said first plenum with air from said air inlets; an inlet manifold with inlet port in one of said rectangular openings opposite the said side having openings for air inlets and urged against said catalyst support and an outlet manifold with outlet port in the other of said rectangular openings urged against said catalyst support; means sealing between said two rectangular openings preventing blowby between said inlet and outlet manifolds, gaskets between said manifolds and said catalyst support and means attaching said manifolds in their respective rectangular openings.

What is claimed is:

1. A container or canister for dual cross-flow catalyst-support comprising, in combination,
   I. a casing of generally parallelepipedal shape with a square outline having square top and bottom and an outer wall of four rectangular sides and means securing said top and bottom to said outer wall,
      A. two of said sides having a common corner therebetween and having equal rectangular openings therein adjacent said common corner and one other of said sides having openings for air inlets and having an air manifold over said openings externally of said casing,
      B. said top and bottom of said casing being dished outward,
      C. said casing containing and holding a refractory ceramic square dual cross-flow catalyst support with ends mating the dishing in said top and bottom and positioned within said casing with pads of intumescent sheet material between said catalyst support and said top and bottom and with two faces of said catalyst support having a first common corner therebetween at the rectangular openings in the said two sides of said casing and two other faces of said catalyst support having a second common corner therebetween, one of said two other faces facing into a first plenum into which said air inlets open and the other into a second plenum,
      D. baffles in said casing adjacent said second common corner of said catalyst support providing a labyrinthine connection between said first plenum and said second plenum for mixing gases entering said first plenum with air from said air inlets,
      E. an inlet manifold with inlet port in one of said rectangular openings opposite the said side having openings for air inlets and urged against said catalyst support and
      F. an outlet manifold with outlet port in the other of said rectangular openings urged against said catalyst support,
      G. means sealing between said two rectangular openings preventing blowby between said inlet and outlet manifolds, gaskets between said manifolds and said catalyst support and means attaching said manifolds in their respective rectangular openings.

2. A container or canister according to claim 1 having the portion of the top including the square dishing removable for access to and replacement of the refractory ceramic square catalyst support.

* * * * *